(12) United States Patent
Schwartz

(10) Patent No.: US 7,725,259 B2
(45) Date of Patent: May 25, 2010

(54) TRAJECTORY ESTIMATION SYSTEM FOR AN ORBITING SATELLITE

(75) Inventor: Lawrence Schwartz, Denver, CO (US)

(73) Assignee: Raytheon Company, Waltham, MA (US)

(*) Notice: Subject to any disclaimer, the term of this patent is extended or adjusted under 35 U.S.C. 154(b) by 0 days.

(21) Appl. No.: 11/744,059

(22) Filed: May 3, 2007

(65) Prior Publication Data

US 2008/0275598 A1 Nov. 6, 2008

(51) Int. Cl.
*G01C 21/00* (2006.01)
*B64G 1/24* (2006.01)
*B64G 1/36* (2006.01)
*B64G 1/26* (2006.01)

(52) U.S. Cl. .................. 701/214; 701/13; 701/219; 701/226; 342/355; 342/357.02; 342/357.09; 342/357.14

(58) Field of Classification Search .............. 244/158.4, 244/158.8, 164, 171, 195; 342/357.02, 357.06, 342/355, 357.09, 357.14; 455/427; 700/56; 701/13, 214, 222, 226, 116, 223, 219; 703/2, 703/6, 8
See application file for complete search history.

(56) References Cited

U.S. PATENT DOCUMENTS

| | | | | |
|---|---|---|---|---|
| 4,752,884 | A * | 6/1988 | Slafer et al. ................... 701/13 |
| 5,411,227 | A * | 5/1995 | Basuthakur et al. ......... 244/169 |
| 5,528,502 | A * | 6/1996 | Wertz .......................... 701/226 |
| 5,556,058 | A * | 9/1996 | Bender ........................ 244/171 |
| 5,687,084 | A * | 11/1997 | Wertz .......................... 701/226 |
| 5,810,297 | A * | 9/1998 | Basuthakur et al. ....... 244/158.8 |
| 6,009,376 | A * | 12/1999 | Brodie et al. ................ 701/226 |
| 6,023,291 | A * | 2/2000 | Kamel et al. ................. 348/147 |
| 6,058,338 | A * | 5/2000 | Agashe et al. .................. 701/13 |
| 6,085,128 | A | 7/2000 | Middour et al. ............... 701/13 |
| 6,233,507 | B1 * | 5/2001 | May ............................. 701/13 |
| 6,314,344 | B1 | 11/2001 | Sauer et al. .................... 701/13 |
| 6,417,798 | B1 * | 7/2002 | Joerck ........................ 342/355 |
| 6,567,712 | B1 * | 5/2003 | Rog et al. ...................... 700/56 |
| 7,443,340 | B2 * | 10/2008 | Abraham et al. ......... 342/357.06 |
| 7,454,272 | B1 * | 11/2008 | Burgess ........................ 701/13 |
| 2003/0096609 | A1 | 5/2003 | Wright ........................ 455/427 |

OTHER PUBLICATIONS

PCT Notification of Transmittal of the International Search Report and the Written Opinion of the International Searching Authority, or the Declaration for International Application No. PCT/US2008/061935, 13 pages, Jul. 24, 2008.

* cited by examiner

*Primary Examiner*—Khoi Tran
*Assistant Examiner*—Dale Moyer
(74) *Attorney, Agent, or Firm*—Baker Botts L.L.P.

(57) ABSTRACT

A method for calculating a trajectory of a satellite following a maneuver includes determining a first estimated trajectory of a satellite using a first sequential mode of operation; performing a thruster burn as a correction maneuver for the satellite; and providing a real-time assessment of the correction maneuver by utilizing a second sequential mode of operation. The second sequential mode of operation includes receiving a data point from an uplink/downlink facility, determining a second estimated trajectory and an estimated thruster performance of the satellite based upon the received data point, and determining a trajectory error of the satellite based upon the received data point. The method further includes repeating the second sequential mode of operation if the trajectory error is above a specified threshold level, and repeating the first sequential mode of operation if the trajectory error is below the specified threshold level.

16 Claims, 3 Drawing Sheets

TRAJECTORY ESTIMATION SYSTEM FOR AN ORBITING SATELLITE

TECHNICAL FIELD OF THE DISCLOSURE

This disclosure relates to satellite systems, and more particularly, to a trajectory estimation system for an orbiting satellite and method of operating the same.

BACKGROUND OF THE DISCLOSURE

The exploration of space has provided for many useful technological innovations. The implementation of satellites depict one type of technological innovation that has been particularly beneficial. Satellites are a type of device that orbit around the Earth in regular intervals, and may provide various useful functions, such as communication transponders, or gatherers of information, such as weather related information. One particular type of satellite is a geosynchronous satellite that is disposed at a particular altitude necessary to have an angular velocity similar to the angular velocity of Earth. In this manner, stations on Earth wishing to communicate with the satellite may orient antennas to one generally direction in the sky in order to communicate with the satellite.

SUMMARY OF THE DISCLOSURE

In one embodiment of the disclosure, a computing system includes a processor and a computer readable medium. The computer readable medium is operable to, when executed on the processor, determine an estimated trajectory of a satellite using a sequential mode of operation, perform a thruster burn, receive a data point from an uplink/downlink facility, determine an estimated trajectory and an estimated thruster performance of the satellite based upon the received data point. If the trajectory error is above a specified threshold level, repeat receiving an updated data point from the uplink/downlink facility, determining an updated estimated trajectory and an updated estimated thruster performance of the satellite based upon the updated data point, and determining an updated trajectory error based upon the updated data point.

Some embodiments of the present disclosure may provide numerous technical advantages. A particular technical advantage of one embodiment may be to provide an estimated trajectory of a satellite following a maneuver in real time. Providing updated course information in real time may provide for calculation of thruster performance. Thus, the efficiency of the maneuver may be quickly determined for possible future maneuvers of the satellite.

While specific advantages have been disclosed hereinabove, it will be understood that various embodiments may include all, some, or none of the previously disclosed advantages. Other technical advantages may become readily apparent to those skilled in the art of visual display apparatuses.

BRIEF DESCRIPTION OF THE DRAWINGS

A more complete understanding of embodiments of this disclosure will be apparent from the detailed description taken in conjunction with the accompanying drawings in which.

DETAILED DESCRIPTION OF EXAMPLE EMBODIMENTS OF THE DISCLOSURE

The trajectory of a satellite's orbit around Earth is important to its proper operation. Usage of the satellite in many cases depends upon predictability of its location at any given point in time. These satellites however, may err from their intended orbit due to several reasons. For example, gravitational forces of the Moon may cause satellites to deviate from their original trajectory, thus necessitating periodic adjustment maneuvers. Thus, satellites of all types may require periodic course adjustment maneuvers in order to maintain a relatively predictable path over the Earth.

Course correction maneuvers for satellites have typically encountered a sequence of actions including determining the current course of the satellite, providing one or more corrective maneuvers to the satellite, and once again determining the course of the satellite in order to determine the effect of one or more thrusters upon the course of the satellite. Determining the course of the satellite following the one or more corrective maneuvers may have encountered an interactive procedure in which successive batches of data points were used to determine the course of the satellite. This process would continue until the trajectory of the satellite was again within specified limits. However, due to the generally uncertain nature of maneuvering the satellite, this sequence of actions would have to be repeated several times until a desirable trajectory was established. Furthermore, determining the new trajectory of the satellite took a relatively long period of time.

Figure 1:
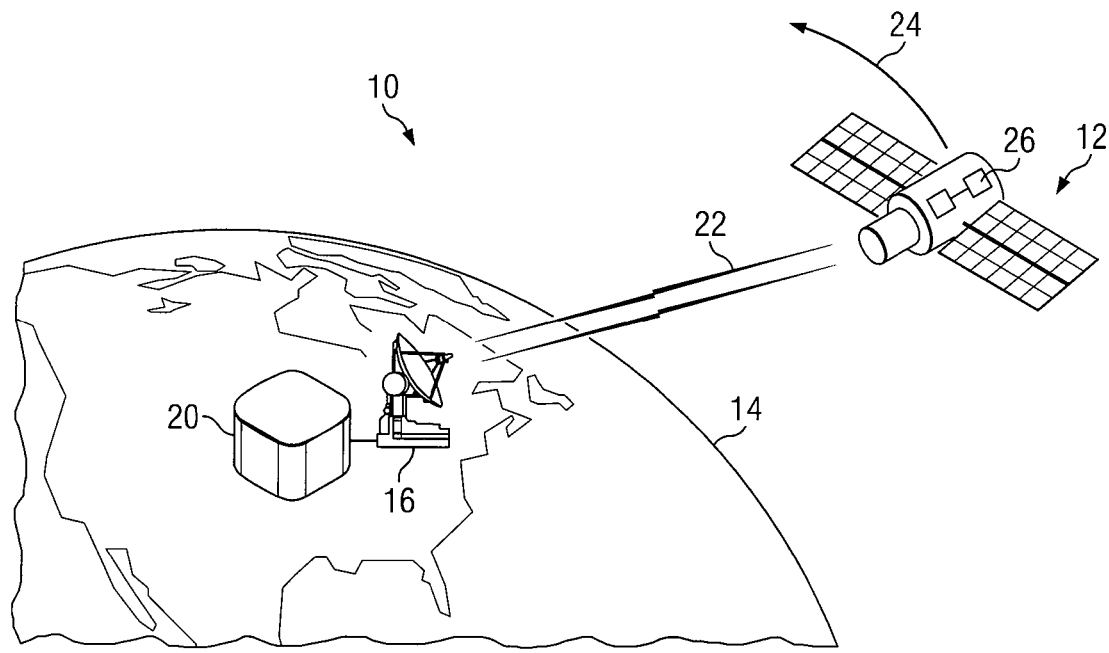
FIG. 1 is a perspective view of one embodiment of a trajectory estimation system for a satellite orbiting the Earth.

FIG. 1 shows one embodiment of a trajectory estimation system 10 according to the teachings of the present disclosure that may provide a solution to the previously described problems.

The trajectory estimation system 10 generally includes a satellite 12 and an uplink/downlink facility 16 that is coupled to a computing system 20 on the Earth 14. Satellite 12 is configured to orbit the Earth 14 and may communicate with the uplink/downlink facility 16 using electromagnetic signals 22. Computing system 20 is operable to utilize electromagnetic signals 22 sent from and to the satellite 12 in order to determine a trajectory 24 of the satellite 12. As will be described in greater detail below, computing system 20 may be operable to sequentially calculate an estimated trajectory of the satellite 12 following a maneuver in a relatively short period of time. The computing system 20 may also provide results in real time in which the estimated trajectory is calculated with increased accuracy following receipt of each data point from uplink/downlink facility 16.

A maneuver or trajectory correction for a satellite 12 may be provided by one or more thrusters 26 configured on the satellite 12. Because these thrusters 26 are generally inaccessible when the satellite 12 is orbiting the Earth 14, they can not be periodically serviced or maintained to ensure their proper operation. Thus during a typical maneuver, any estimation of the performance of these thrusters 26 may be generally inaccurate. A typical maneuver of satellite 12 using thrusters 26 may only provide a rough estimation of the new trajectory of the satellite 12 following a maneuver. In one embodiment, computing system 20 may be operable to estimate thruster performance by calculating the new trajectory 24 of the satellite 12 in real time.

The computing system 20 may communicate with the satellite 12 using any suitable signaling approach for determining the trajectory 24 of the satellite 12. The trajectory 24 of satellite 12 may be determined by calculating a number of positions of the satellite over a corresponding number of elapsed periods of time. In one embodiment, a locus of range measurements may be determined by measuring an elapsed time for transmit and receipt of electromagnetic signals 22 from the uplink/downlink facility 16 to the satellite 12. Given this locus of range measurements, the computing system 20 may be operable to fit each of these range measurements to trajectory 24. In another embodiment, several uplink/downlink facilities 16 may be employed to measure a corresponding several range measurements such that the satellite's position in space may be "triangulated" from these several range measurements. In another embodiment, the instantaneous position of the satellite 12 may be determined using telemetry data, such as a global positioning system (GPS) system configured onboard the satellite. In yet another embodiment, range measurements may be taken from one or more nearby satellites and resulting telemetry data relayed to the Earth 14 using uplink/downlink facility 16.

Figure 2:
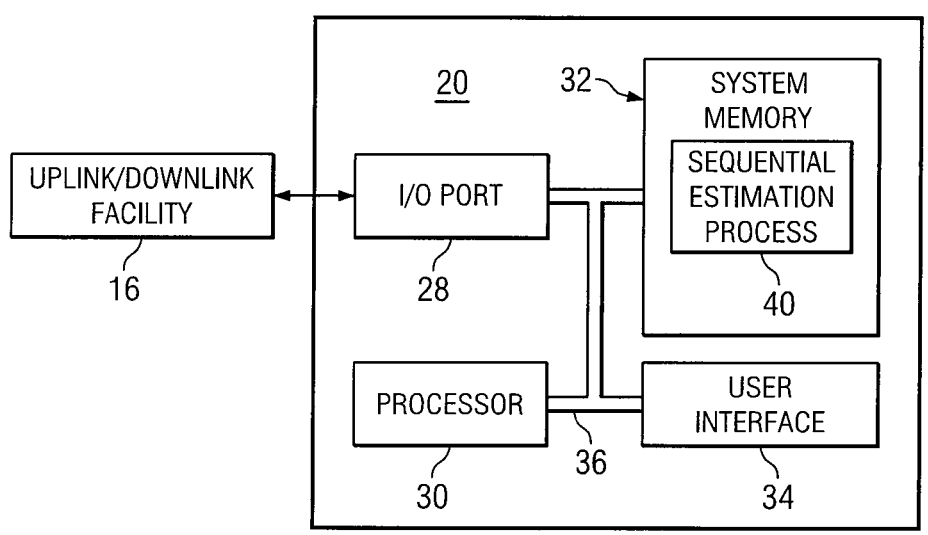
FIG. 2 is a block diagram of the uplink/downlink facility and computing system of the embodiment of FIG. 1.

FIG. 2 is a block diagram showing one embodiment of a computing system 20 that may be operable to perform the various features of the trajectory estimation system 10. Computing system 20 may include an input/output port 28, a processor 30, a memory 32, and a user interface 34 that are coupled together by a system bus 36. Input/output port 28 may be coupled to uplink/downlink facility 16 for receiving position information about satellite 12. Input/output port 28 may incorporate any suitable protocol, such as, for example, an Ethernet protocol, RS-232 protocol, or other protocol capable of providing communication with uplink/downlink facility 16. User interface 34 may include input devices and output devices to enable user interaction with the trajectory estimation system 10. Input devices may include any suitable device for user input, such as a keyboard, and/or a mouse. Output devices may includes cathode ray tubes (CRTs), liquid crystal displays (LCDs), or other device capable of providing visual information to the user.

The system memory 32 may be operable to store various forms of data, which may be, for example, information used by the computing system 20. System memory 32 may include any volatile or non-volatile memory device, such as read-only memory (ROM), random access memory (RAM), or a fixed storage such as an optical or magnetic bulk data storage medium. The system memory 32 is operable to store a sequential estimation process 40 that may be a plurality of instructions that are executable by processor 30. The previously described computing system 20 may be any suitable computing system, which may be, for example, a personal computer, laptop computer, mainframe computer, or any suitable computer system that is capable of performing the various features of the trajectory estimation system 10.

Figure 3:
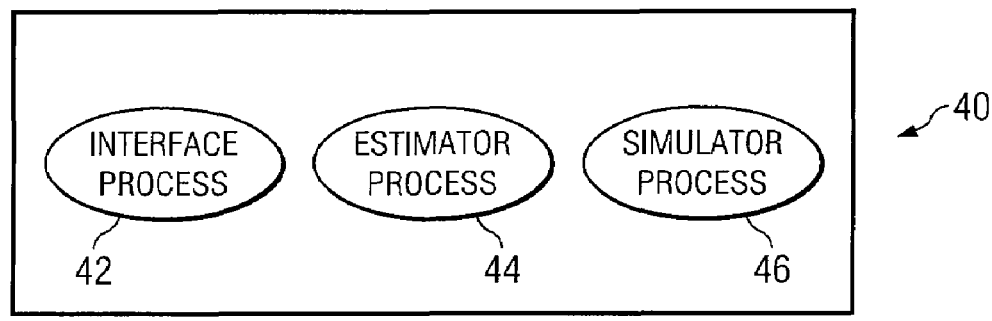
FIG. 3 is a block diagram showing one embodiment of several processes that may be used to implement the sequential estimation process of FIG. 2.

FIG. 3 is a block diagram showing one embodiment of several components that may be used to implement the sequential estimation process 40. Sequential estimation process 40 may have an interface process 42, an estimator process 44, and a simulator process 46. Interface process 42 may be operable to convert data inputted from uplink/downlink facility 16 into a form that is usable by estimator process 44 and/or simulator process 46. In one embodiment, interface process 42 may be operable to filter extraneous information received from uplink/downlink facility 16. For example, data from uplink/downlink facility 16 may be in the form of messages that include satellite range information in addition to other forms of extraneous data. Interface process 42 may be able to filter useful information from these messages in order to extract useful satellite positioning information from these messages. In another embodiment, interface process 42 may be operable to convert information received from uplink/downlink facility 16 into a form that is usable by estimator process 44 or simulator process 46. For example, data from uplink/downlink facility 16 may transmit range information for satellite 12 in metric units. In this particular example, interface process 42 may be operable to recognize this non-native format of the data and convert the data to Standard American Equivalent (SAE) units.

Simulator process 46 may be operable to calculate the trajectory 24 from periodic messages provided by the interface process 42. In one embodiment, simulator process 46 may be operable to calculate the measured trajectory 24 of satellite 12 following receipt of each message having range related information from interface process 42. In this manner, the measured trajectory 24 may be iteratively more accurate following receipt of each message. As will be described below, estimator process 44 may be operable to calculate a trajectory error based on messages received from simulator process 46. Estimator process 44 may also be operable to calculate another estimated trajectory for each message that is received from simulator process 46.

Figure 4:
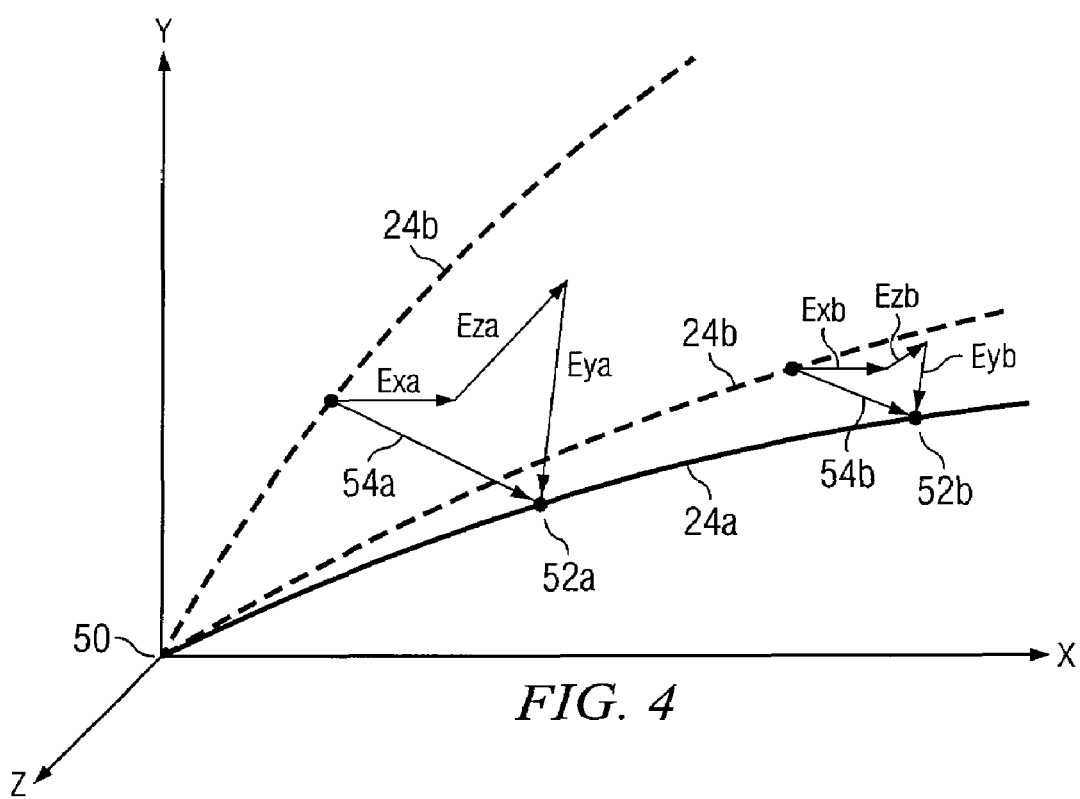
FIG. 4 is a three dimensional Cartesian coordinate system showing a measured and estimated trajectory that may be calculated by the computing system of FIG. 1.

FIG. 4 is a graph showing a three-dimensional Cartesian coordinate system that may be used to model an actual trajectory 24a and on or more estimated trajectories 24b representing a course taken by satellite 12 following a maneuver. The origin 50 of the graph designates the beginning of a maneuver. A maneuver generally refers to operation of one or more thrusters 26 for a specified period of time. In response to the maneuver, the satellite 12 may deviate from its original trajectory. The computing system 20 may be operable to calculate estimated trajectories 24b for each successive data point 52 that is received from uplink/downlink facility 16. Data points 52 may be position information that is derived from messages transmitted from uplink/downlink facility 16. As will be described in greater detail below, computing system 20 may provide an estimated trajectory 24b of satellite 12 that more accurately approximates actual trajectory 24a following receipt of each successive data point 52. For example, following receipt of a first data point 52a, computing system 20 may calculate an estimated trajectory 24b having error vector Exa, Eya, and Eza. Error vector Exa, Eya, and Eza, which is shown in its component Cartesian values, provides an approximate error of estimated trajectory 24b. Computing system 20 may also be operable to calculate a scalar error value 54a that is a scalar approximation of the estimated trajectory 24a error. Following receipt of a second data point 52b another estimated trajectory 24b may be calculated having error vector Exb, Eyb, and Ezb and associated scalar error value 54b. Thus, computing system 20 may be operable to calculate an estimated trajectory 24b that is iteratively more accurate following receipt of each successive data point 52.

Certain embodiments may provide an advantage in that calculated results of a maneuver may be provided to a user following receipt of each data point 52. The estimated trajectory 24 of satellite 12 may be iteratively calculated, thus providing results in real time. Providing updated course information in real time may provide for calculation of thruster performance. That is, the burn rate, and burn time of the thrusters 26 may be compared to course deviation of the satellite 12 in real time in order to compute performance of the thrusters 26.

As previously described, uplink/downlink facility 16 transmits data points 52 that describe the instantaneous position of the satellite 12 to computing system 20 at regular intervals. A number of these data points 52 may have a normal statistical distribution that is fitted to the estimated trajectory 24b. Due to various environmental aspects, such as weather, cloud cover, or proximity of the satellite 12 to the uplink/downlink facility 16, data points 52 may be transmitted to computing system 20 that are outside the normal statistical distribution. In one embodiment, estimator process 44 may calculate the estimated trajectory 24b using a bounded algorithm. In this manner, data points 52 outside of the normal statistical distribution may not unduly affect the accuracy of the estimated trajectory 24b. In another embodiment, the bounded algorithm used by the estimator process 44 is a least squares algorithm. A least squares algorithm is a type of mathematical algorithm that creates a "best fit" function to a number of data points. The least squares algorithm applies a weighting factor to each of the data points 52 such that data points outside the normal statistical distribution are weighted less than other data points 52. Thus, the least squares type of algorithm may be operable to reduce the adverse effects of errors in data points 52 in order to calculate an estimated trajectory 24b that best simulates the actual path of the satellite 12.

Figure 5:
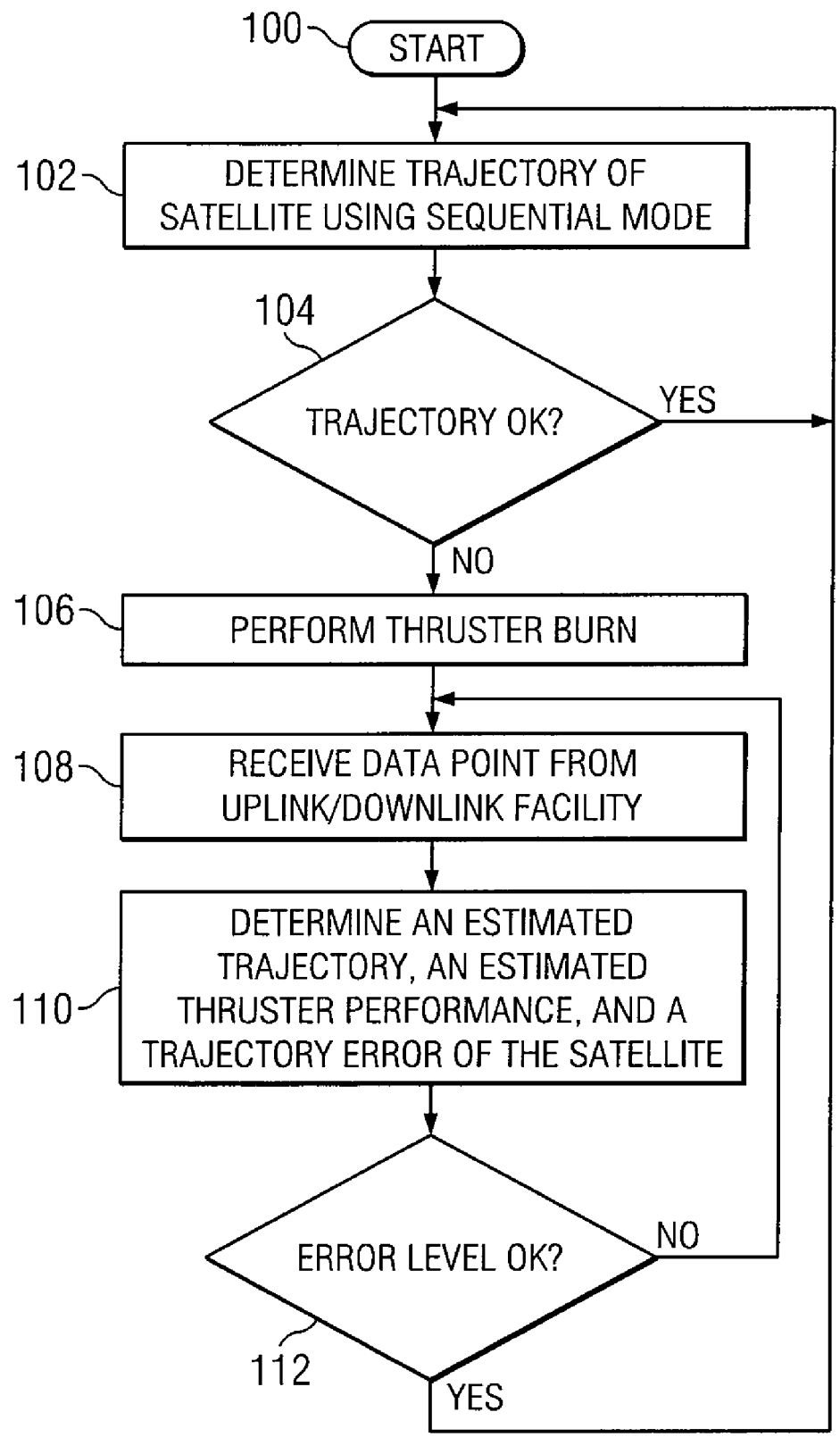
FIG. 5 is a series of actions that may be taken by the computing system to perform the various features of the embodiment of FIG. 1.

FIG. 5 is a flowchart showing one embodiment of a sequence of actions that may be taken by computing system 20 in order to determine the trajectory of a satellite 12. In act 100, the process is initiated.

In act 102, the current trajectory of the satellite 12 is determined using the sequential mode of operation. The sequential mode of operation generally refers to estimation of the trajectory using the latest data point received in conjunction with a number of previously received data points. Sequential mode in a sense generally implies the use of sets of observations with a prior estimate and associated statistics. The result of processing each set provides the basis for the processing of the next set. In some embodiments, the sequential mode of operation may include sequential batch processing in which sets of data points are used rather than single data points. In one embodiment, the estimated trajectory 24b of satellite 12 may be determined by calculating a number of positions of the satellite over a corresponding number of elapsed periods of time. Thus, the estimated trajectory 24b of the satellite 12 may be determined, prior to thruster burn, to assess whether any trajectory correction is needed or desired.

In act 104, the adequacy of the estimated trajectory 24b may be assessed. If the estimated trajectory 24b is deemed to be adequate, processing continues at act 102. However, if the estimated trajectory 24b is not adequate, processing continues at act 106.

In act 106, a thruster burn may be performed to correct the trajectory 24 of the satellite 12. A desired trajectory 24b may be used to determine a particular thruster burn rate and burn time. That is, the trajectory 24a may be compared with the desired trajectory 24b to manipulate the thrusters 26 using an operation commonly referred to as a maneuver plan. The maneuver plan may include determining the thruster burn rate and burn time based upon an estimated performance of the thrusters 26 in conjunction with the amount of course correction desired. From the desired course trajectory 24b, simulator process 46 may calculate a vector deviation value x that is the difference between the desired course trajectory 24 and an original course trajectory. Due to operation of the thrusters 26, trajectory determination of the satellite 12 is changed from sequential mode to expansion mode of operation.

The expanding mode of operation is described with respect to actions 108 through 112. The expanding mode of operation is operable to calculate a new estimated trajectory 24b for each data point received from the interface process 42 in a similar manner to the sequential mode of operation as described with respect to act 102. The expanding mode of operation differs however, in that it uses a fixed epoch for calculating the estimated trajectory 24b. The expanding mode may also use course trajectory and trajectory error information from the sequential mode of operation as a starting point for further trajectory calculations.

In act 108, a first data point 52 is received from the uplink/downlink facility 16. Using this data point 52, the estimated trajectory 24 may be modified based upon the data point 52, in act 110.

In act 110, the estimated trajectory 24b, estimated thruster performance, and trajectory error may be calculated using the received data point 52. In one embodiment, the trajectory error may be calculated by first calculating a residual value y as shown in formula (F1).

$$y = Hx + v \tag{F1}$$

where:
H=partial derivative vector matrix
y=residual vector matrix
v=vector noise variable H is a matrix that includes partial derivatives that are calculated using data point 52 with previously recorded data points. The partial derivatives may be derived according to each of the three component spatial component vectors. The variable "v" is a noise variable that may include statistical measurement error of the data point 52 with previously recorded data points. Using this residual vector y, an error vector E and an error value 54 may be calculated. Error vector E is a vector quantity of the difference between the estimated trajectory 24a and the measured trajectory 24b of the satellite 12. Error value 54 may be used to assess convergence of the iterative estimator process 44.

In one embodiment, Error vector E may be a least-squares estimate of the correction to the estimated vector value x. Using a least-squares estimate of Error vector E causes data points 52 with significant measurement error to be weighted relatively less than other data points 52. In this manner, data points 52 that may be out of bounds may not introduce undue estimation error. Error vector E may be calculated according to formula (F2).

$$E = (H^T R^{-1} H)^{-1} H^T R^{-1} y \tag{F2}$$

where:
R=covariance vector matrix of the errors in the observations
$H^T$=transpose of matrix H
$R^{-1}$=inverse of covariance vector matrix R.

The error value 54 may be calculated according to formula (F3).

$$\text{error value} = y^T R^{-1} y \tag{F3}$$

where:
$y^T$=transpose of residual vector matrix y

In act 112, the adequacy of the trajectory error is assessed. If the trajectory error is above a specified threshold level, the expanding mode of operation is again performed starting at act 108. Acts 108 through 112 may be performed repeatedly until a desired level of accuracy is achieved. However, if the trajectory error goes below the specified threshold level, processing reverts to the sequential mode of operation as previously described with respect to act 102.

Thus, one embodiment of a process has been described that allows a user to instantaneously view an estimated trajectory 24b of a satellite following receipt of each data point 52 from an uplink/downlink facility 16. Calculation of the estimated trajectory 24b following receipt of each data point 52 may yield a real time assessment of the correction maneuver, thus enabling the characterization of the performance of the thrusters 26 in some embodiments.

Although the present disclosure and its advantages have been described in detail, it should be understood that various changes, substitutions, and alterations can be made therein without departing from the spirit and scope of this disclosure as defined by the appended claims.

What is claimed is:

1. A system for determining a trajectory of a satellite comprising:
   a processor; and
   a computer program stored in a computer-readable medium, and executable on the processor, the computer program operable, when executed on the processor to:
   determine a first estimated trajectory of a satellite using a first sequential mode of operation;
   perform a thruster burn as a correction maneuver for the satellite;

provide a real-time assessment of the correction maneuver by utilizing a second sequential mode of operation, the second sequential mode of operation comprising:

receiving a data point from an uplink/downlink facility;

determining, using a least squares algorithm, a second estimated trajectory and an estimated thruster performance of the satellite based upon the received data point; and determining, using the least squares algorithm, a trajectory error of the satellite based upon the received data point, the trajectory error including a vector quantity indicating position error in space and a scalar error value; and repeat the second sequential mode of operation if the trajectory error is above a specified threshold level; and repeat the first sequential mode of operation if the trajectory error is below the specified threshold level.

2. The system of claim 1, wherein the computer program is further operable to determine the data point using ranging information from the uplink/downlink facility.

3. The system of claim 1, wherein the computer program is further operable to determine the data point using telemetry information from the uplink/downlink facility.

4. A system comprising:

a processor; and a computer program stored in a computer-readable medium and executable on the processor, the computer program operable, when executed on the processor to:

determine a first estimated trajectory of a satellite using a first sequential mode of operation;

perform a thruster burn as a correction maneuver for the satellite;

provide a real-time assessment of the correction maneuver by utilizing a second sequential mode of operation, the second sequential mode of operation comprising:

receiving a data point from an uplink/downlink facility;

determining, using a least squares algorithm, a second estimated trajectory and an estimated thruster performance of the satellite based upon the received data point; and determining, using the least squares algorithm, a trajectory error of the satellite based upon the received data point, the trajectory error including a vector quantity indicating position error in space and a scalar error value; and repeat the second sequential mode of operation if the trajectory error is above a specified threshold level; and repeat the first sequential mode of operation if the trajectory error is below the specified threshold level.

5. The system of claim 4, wherein the first sequential mode of operation comprises determining the estimated trajectory of the satellite by calculating a plurality of data points from the uplink/downlink facility over a corresponding plurality of elapsed periods of time.

6. The system of claim 4, wherein the computer program is further operable to determine if the trajectory error is less than a specified threshold level, and if the trajectory error is less than the specified threshold level, determine the estimated trajectory of the satellite using the first sequential mode of operation.

7. The system of claim 4, wherein the satellite includes a microwave transponder circuit.

8. The system of claim 4, wherein the data point is referenced to three dimensional Cartesian space.

9. The system of claim 4, wherein the computer program is further operable to determine the data point using ranging information from the uplink/downlink facility.

10. The system of claim 4, wherein the computer program is further operable to determine the data point using telemetry information from the uplink/downlink facility.

11. A method for calculating a trajectory of a satellite following a maneuver comprising:

determining a first estimated trajectory of a satellite using a first sequential mode of operation;

performing a thruster burn as a correction maneuver for the satellite;

providing a real-time assessment of the correction maneuver by utilizing a second sequential mode of operation, the second sequential mode of operation comprising:

receiving a data point from an uplink/downlink facility;

determining, using a least squares algorithm, a second estimated trajectory and an estimated thruster performance of the satellite based upon the received data point;

determining, using the least squares algorithm, a trajectory error of the satellite based upon the received data point, the trajectory error including a vector quantity indicating position error in space and a scalar error value; and repeating the second sequential mode of operation if the trajectory error is above a specified threshold level; and repeating the first sequential mode of operation if the trajectory error is below the specified threshold level.

12. The method of claim 11, wherein the satellite includes a microwave transponder circuit.

13. The method of claim 11, further comprising determining the data point using ranging information from the uplink/downlink facility.

14. The method of claim 11, further comprising determining the data point using telemetry information from the uplink/downlink facility.

15. The method of claim 11, wherein determining an estimated trajectory using a sequential mode of operation further comprises determining an estimated trajectory by calculating a plurality of data points from the uplink/downlink facility over a corresponding plurality of elapsed periods of time.

16. The method of claim 11, further comprising if the trajectory error is less than the specified threshold level, determining the estimated trajectory of the satellite using the sequential mode of operation.

* * * * *